(12) United States Patent
Nicolls et al.

(10) Patent No.: US 10,921,427 B2
(45) Date of Patent: Feb. 16, 2021

(54) DRONE-BASED CALIBRATION OF A PHASED ARRAY RADAR

(71) Applicant: LEOLABS, INC., Menlo Park, CA (US)

(72) Inventors: Michael Nicolls, Portola Valley, CA (US); John Buonocore, Redwood City, CA (US)

(73) Assignee: LeoLabs, Inc., Menlo Park, CA (US)

( * ) Notice: Subject to any disclaimer, the term of this patent is extended or adjusted under 35 U.S.C. 154(b) by 221 days.

(21) Appl. No.: 15/901,762

(22) Filed: Feb. 21, 2018

(65) Prior Publication Data

US 2019/0257920 A1    Aug. 22, 2019

(51) Int. Cl.
*G01S 7/40* (2006.01)
*G01S 13/06* (2006.01)
(Continued)

(52) U.S. Cl.
CPC .......... *G01S 7/4052* (2013.01); *G01S 7/4008* (2013.01); *G01S 7/4026* (2013.01); *G01S 13/06* (2013.01);
(Continued)

(58) Field of Classification Search
CPC ...... G01S 7/4052; G01S 7/4026; G01S 13/42; G01S 19/13; G01S 13/06; G01S 7/4008; G01S 2007/4082; G01S 2013/0245
(Continued)

(56) References Cited

U.S. PATENT DOCUMENTS 2,471,284 A    5/1949    Rea
2,969,542 A    1/1961    Coleman et al.
(Continued)

FOREIGN PATENT DOCUMENTS

AU    2016246770    7/2020
EP    0919835    6/1999
(Continued)

OTHER PUBLICATIONS

Australia Office Action dated Oct. 7, 2019 for Serial No. 2016246770 filed Apr. 8, 2016 (5 pages).
(Continued)

*Primary Examiner* — Frank J McGue
(74) *Attorney, Agent, or Firm* — Dentons US LLP

(57) ABSTRACT

A method of calibrating a phased-array radar includes receiving a signal at one of either a mobile platform or an antenna element of the phased-array radar, the transmission being sent as a transmitted signal from either the mobile platform or the antenna element, correlating the received signal to the transmitted signal to produce an initial phase delay for that antenna element, determining a difference between the initial phase delay and an expected phase delay, wherein the expected phase delay is based upon a relative position between the antenna element and the mobile platform, and saving the difference as a final phase delay for the antenna element. A system for calibrating a phased-array radar includes a phased-array radar having an array of antenna elements, and a mobile platform capable of flying over the phased-array. The mobile platform has an antenna, a transmitter to transmit signals through the antenna, a software defined receiver tuned to operations of the phased-array radar, and a global positioning satellite receiver.

22 Claims, 3 Drawing Sheets

(51) Int. Cl.
*G01S 19/13* (2010.01)
*G01S 13/42* (2006.01)
*G01S 13/02* (2006.01)

(52) U.S. Cl.
CPC .............. *G01S 13/42* (2013.01); *G01S 19/13* (2013.01); *G01S 2007/4082* (2013.01); *G01S 2013/0245* (2013.01)

(58) Field of Classification Search
USPC ........................................................ 342/174
See application file for complete search history.

(56) References Cited

U.S. PATENT DOCUMENTS

| | | | |
|---|---|---|---|
| 3,612,845 A | 10/1971 | Lawlor | |
| 4,500,882 A | 2/1985 | Katagi et al. | |
| 4,769,777 A | 9/1988 | Bittle et al. | |
| 4,780,726 A | 10/1988 | Archer et al. | |
| 4,791,421 A * | 12/1988 | Morse | H01Q 3/26 342/368 |
| 5,003,314 A * | 3/1991 | Berkowitz | G01S 7/4017 342/174 |
| 5,008,844 A * | 4/1991 | Kyriakos | G01S 3/02 342/174 |
| 5,115,246 A | 5/1992 | Thomas, Jr. et al. | |
| 5,130,718 A | 7/1992 | Wu et al. | |
| 5,570,307 A | 10/1996 | Takahashi | |
| 5,748,140 A | 5/1998 | Schober | |
| 5,900,844 A | 5/1999 | Hill | |
| 5,952,961 A * | 9/1999 | Denninger | G01S 7/4004 342/357.3 |
| 6,169,522 B1 | 1/2001 | Ma et al. | |
| 6,188,913 B1 * | 2/2001 | Fukagawa | H01Q 3/2605 455/562.1 |
| 6,271,786 B1 | 8/2001 | Huff et al. | |
| 6,320,553 B1 | 11/2001 | Ergene | |
| 6,456,231 B1 | 9/2002 | McEwan | |
| 6,522,210 B1 | 2/2003 | Dvorak et al. | |
| 6,664,939 B1 | 12/2003 | Olinyk et al. | |
| 6,862,605 B2 | 3/2005 | Wilber | |
| 6,914,554 B1 | 7/2005 | Riley et al. | |
| 6,933,888 B1 | 8/2005 | Schiffmiller et al. | |
| 6,965,351 B1 | 11/2005 | Miller et al. | |
| 7,009,560 B1 * | 3/2006 | Lam | H01Q 3/2682 342/374 |
| 7,068,218 B2 * | 6/2006 | Gottl | H01Q 1/246 342/368 |
| 7,375,676 B1 | 5/2008 | Loberger | |
| 7,573,420 B2 * | 8/2009 | Forstner | G01S 7/032 342/175 |
| 9,395,447 B2 * | 7/2016 | Dolgin | G01S 19/41 |
| 9,784,819 B2 * | 10/2017 | Asada | G01S 7/4008 |
| 2003/0083063 A1 | 5/2003 | Wang et al. | |
| 2004/0259497 A1 | 12/2004 | Dent | |
| 2005/0012658 A1 * | 1/2005 | Eriksson | H01Q 3/267 342/174 |
| 2006/0132354 A1 | 6/2006 | Beard et al. | |
| 2007/0018882 A1 | 1/2007 | Manoogian et al. | |
| 2009/0066561 A1 | 3/2009 | Yoshimura | |
| 2009/0201206 A1 * | 8/2009 | Li | G01S 7/2813 342/373 |
| 2011/0122016 A1 * | 5/2011 | Lomes | H01Q 3/267 342/174 |
| 2013/0147658 A1 | 6/2013 | Burri et al. | |
| 2014/0225796 A1 | 8/2014 | Chen et al. | |
| 2015/0279103 A1 | 10/2015 | Naegle et al. | |
| 2016/0161604 A1 | 6/2016 | Clark | |
| 2016/0320475 A1 * | 11/2016 | Kellar | G01S 13/42 |
| 2017/0288475 A1 * | 10/2017 | Lee | G01S 13/42 |

FOREIGN PATENT DOCUMENTS

| | | |
|---|---|---|
| EP | 2137789 | 5/2013 |
| EP | 2637253 | 9/2013 |
| WO | WO2002031915 | 4/2002 |
| WO | WO2008114246 | 9/2008 |
| WO | WO2016164758 | 10/2016 |

OTHER PUBLICATIONS

Europe Supplementary Search Report dated Sep. 12, 2018 for Serial No. 16777378.7 filed Apr. 8, 2016 (10 pages).
International Search Report and Written Opinion dated Aug. 30, 2016 for Application No. PCT/2016/026697 filed Apr. 8, 2016 (11 pages).
International Search Report and Written Opinion dated Jan. 3, 2019 for Application No. PCT/US2018/055812 dated Jan. 3, 2019 (6 pages).
Rahmat-Samii et al., Advanced precipitation Radar antenna: array-fed offset membrane cylindrical reflector antenna, IEEE Transactions on Antennas and Propagation., vol. 53, No. 8, Aug. 2005, pp. 2503-2515.

* cited by examiner

DRONE-BASED CALIBRATION OF A PHASED ARRAY RADAR

BACKGROUND

Phased array radars consist of many transmit and receive elements. Calibration of these elements determines the efficiency of beam formation and the sensitivity of the phased array system. Each element may have different phase contributions resulting from cable and trace lengths, component variations, temperature gradients and other effects. Typically, calibration of the elements involves use of an external phase reference.

The external phase reference generally consists of a fixed, external radiator or receiver source to which all elements in the array are referenced. This source may comprise a man-made source such as a beacon, or a natural source, such as a radio star. The exact location of this source allows the source to function as a phase calibrator.

Other approaches may try to avoid phase ambiguities with one of precise timing, lab calibration or removing the sources with the largest phase errors.

SUMMARY

One embodiment is a method of calibrating a phased-array radar. The method includes receiving a signal at one of either a mobile platform or an antenna element of the phased-array radar, the transmission being sent as a transmitted signal from either the mobile platform or the antenna element, correlating the received signal to the transmitted signal to produce an initial phase delay for that antenna element, determining a difference between the initial phase delay and an expected phase delay, wherein the expected phase delay is based upon a relative position between the antenna element and the mobile platform, and saving the difference as a final phase delay for the antenna element.

Another embodiment is a system for calibrating a phased-array radar. The system includes a phased-array radar having an array of antenna elements, and a mobile platform capable of flying over the phased-array. The mobile platform has an antenna, a transmitter to transmit signals through the antenna, a software defined receiver tuned to operations of the phased-array radar, and a global positioning satellite receiver.

DETAILED DESCRIPTION OF THE EMBODIMENTS

Figure 1:
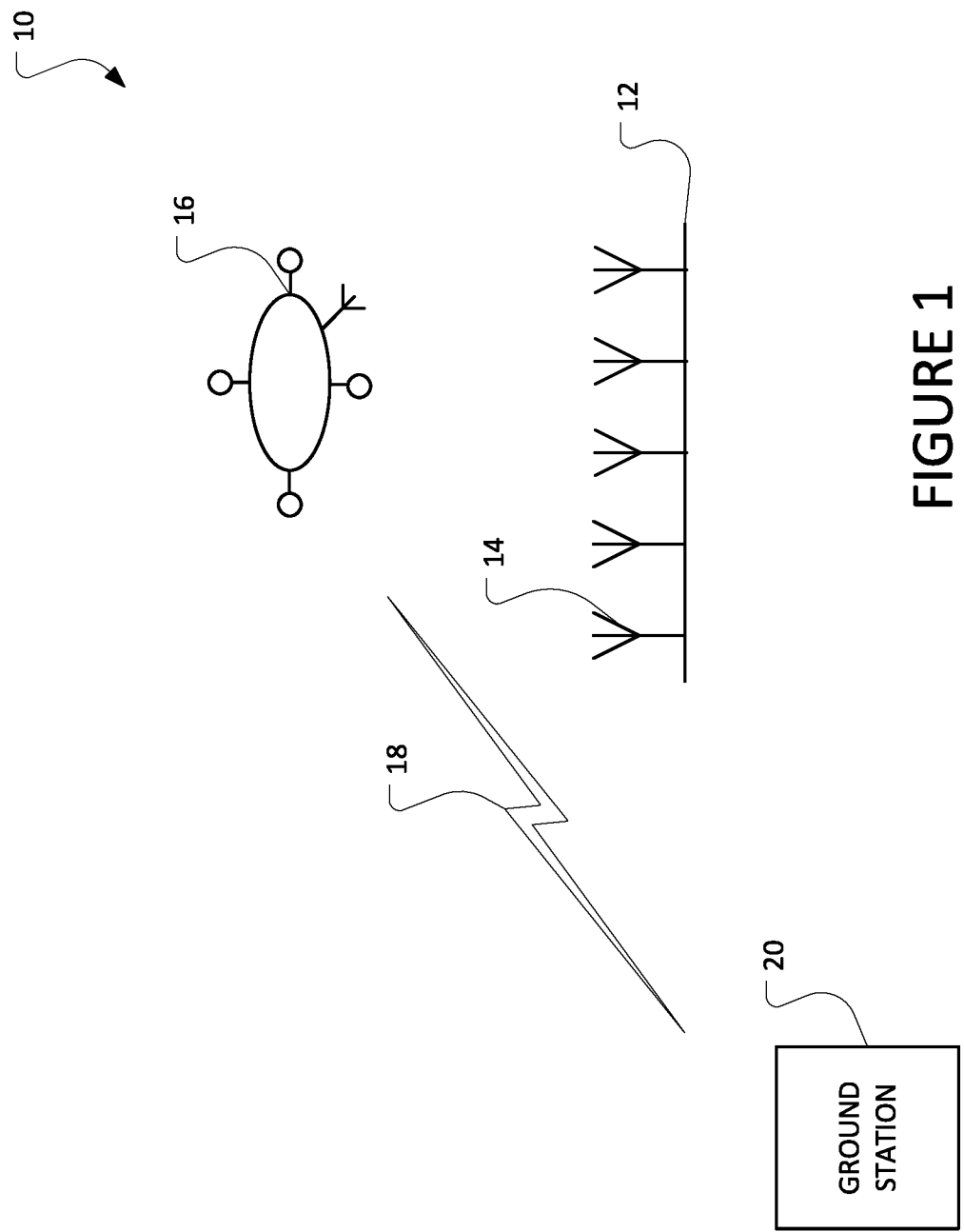
FIG. 1 shows an embodiment of a system to calibrate a phased array radar.

FIG. 1 shows a system 10 usable to calibrate a phased-array radar 12. These radars typically consist of several transmit and receive antenna elements such as 14. These elements need to undergo calibration. Calibration determines the efficiency of the beam formation and ultimately the sensitivity of the phased array radar. As used here, a phased-array radar consists of a radar having several antenna elements. Each of these elements have different phase contributions resulting from differing cable and/or trace lengths, component variations among elements, temperature gradients, etc.

The system of FIG. 1 includes a mobile platform, such as a flyable drone 16, linked by a communications link 18 to a ground station 20. The ground station may exist separately from a controller used to manage the entire array radar, or the controller for the phased-array radar may incorporate the functionality of the array controller. Each antenna element within the radar may have an individual controller to manage signals, as well, but those are outside this discussion.

The mobile platform may consist of an unmanned autonomous vehicle (UAV) drone that flies under control of the ground station. Alternatively, it may be tethered to the radar array and controlled by the array controller, if separate. No particular implementation of the mobile platform is intended nor should any be implied. Details on one embodiment of a mobile platform may be disclosed for ease of understanding, but should not be used to limit the nature of the mobile platform.

Figure 2:
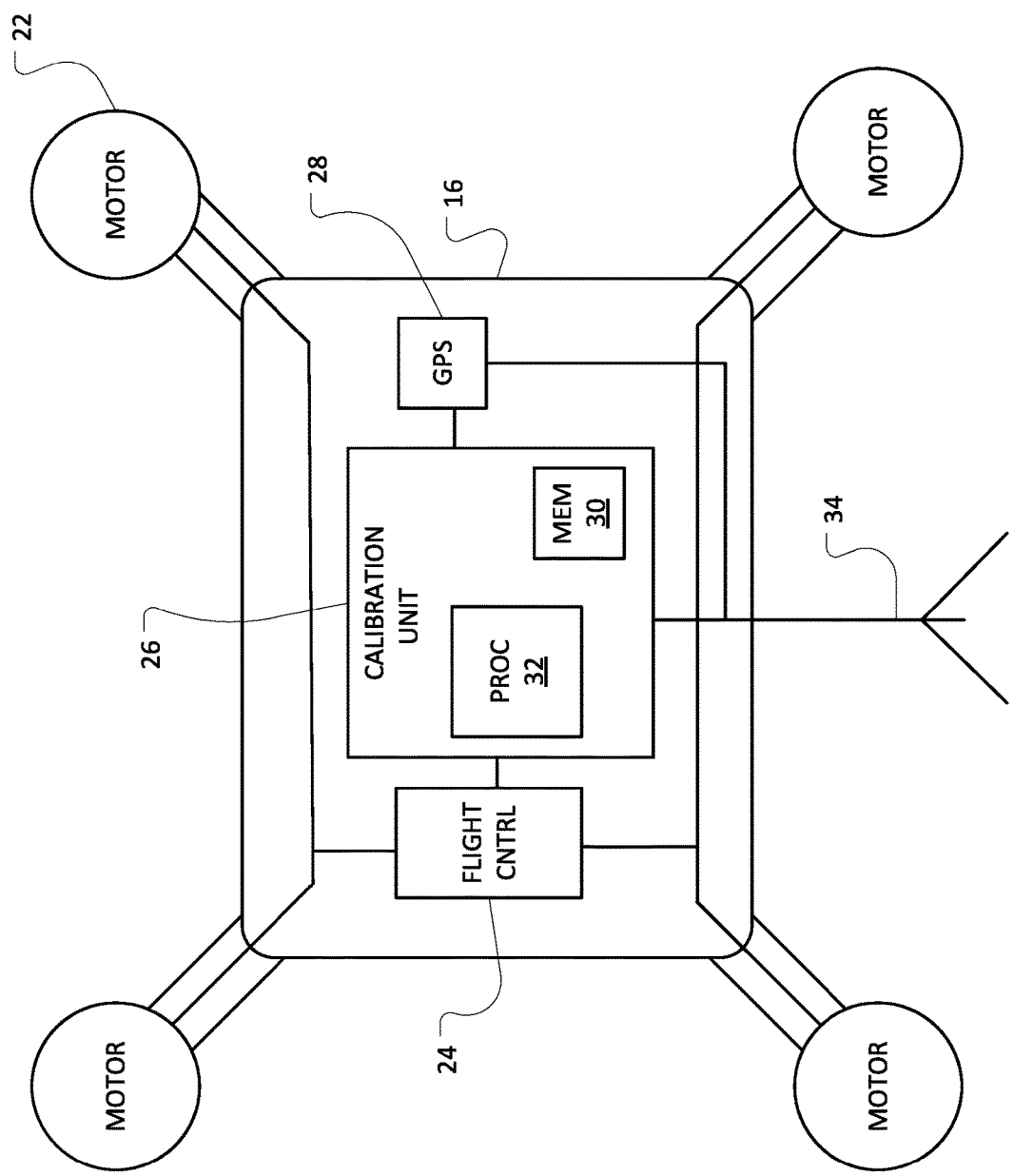
FIG. 2 shows an embodiment of a mobile platform used to calibrate a phased array radar.

FIG. 2 shows an embodiment of the mobile platform 16. In this embodiment, the mobile platform consists of a flying drone having at least one motor such as 22. The drone has a flight controller 24 that operates the motors to cause the drone to take flight and to provide directional control. The flight control 24 may be responsive to an operator or may have programming that allows it to fly in response to the program instructions. The calibration unit 26 may include a processor 32 and a memory 30 that form a software defined receiver (SDR). Alternatively, the flight control 24 and the processor executing code to form the SDR may be the same processor. The memory 30 may include operating instructions for the SDR and/or the flight controller, as well as having a region in which data may be stored, as will be discussed in more detail later. While the current embodiment shows a powered drone, one should note that it could be an unpowered platform, such as a balloon or 'kite' based platform.

As the position of the mobile platform at transmission and reception of the signals is critically important, the mobile platform will have a location module, such as a Global Positioning Satellite (GPS) receiver 28, or other type of precise positioning receiver, such as a differential GPS system. The GPS may have its own antenna for receiving GPS signals, or it may 'share' the antenna 34 that is sending and receiving signals to and from the antenna elements of the phased array radar. The mobile platform may be the receiver of the signals when the antenna elements undergo calibration of their transmission path, or it may be the transmitter when the antenna elements undergo calibration of their receiving path. The mobile platform may have one or more antennas that provide at least three functions, GPS, ground control communication, and transmit/receive. These may be combined in less than three antennas, but the platform will need all three capabilities.

As mentioned above, the mobile platform will send and receive signals to be compared with data related to other signals. This comparison may occur at the ground station as the information is relayed from the mobile platform, or the mobile platform may store the information in the memory for later analysis by the ground station. Alternatively, the mobile platform may perform the analysis and provide the phase delay adjustments to the ground station.

Figures 3, 4:
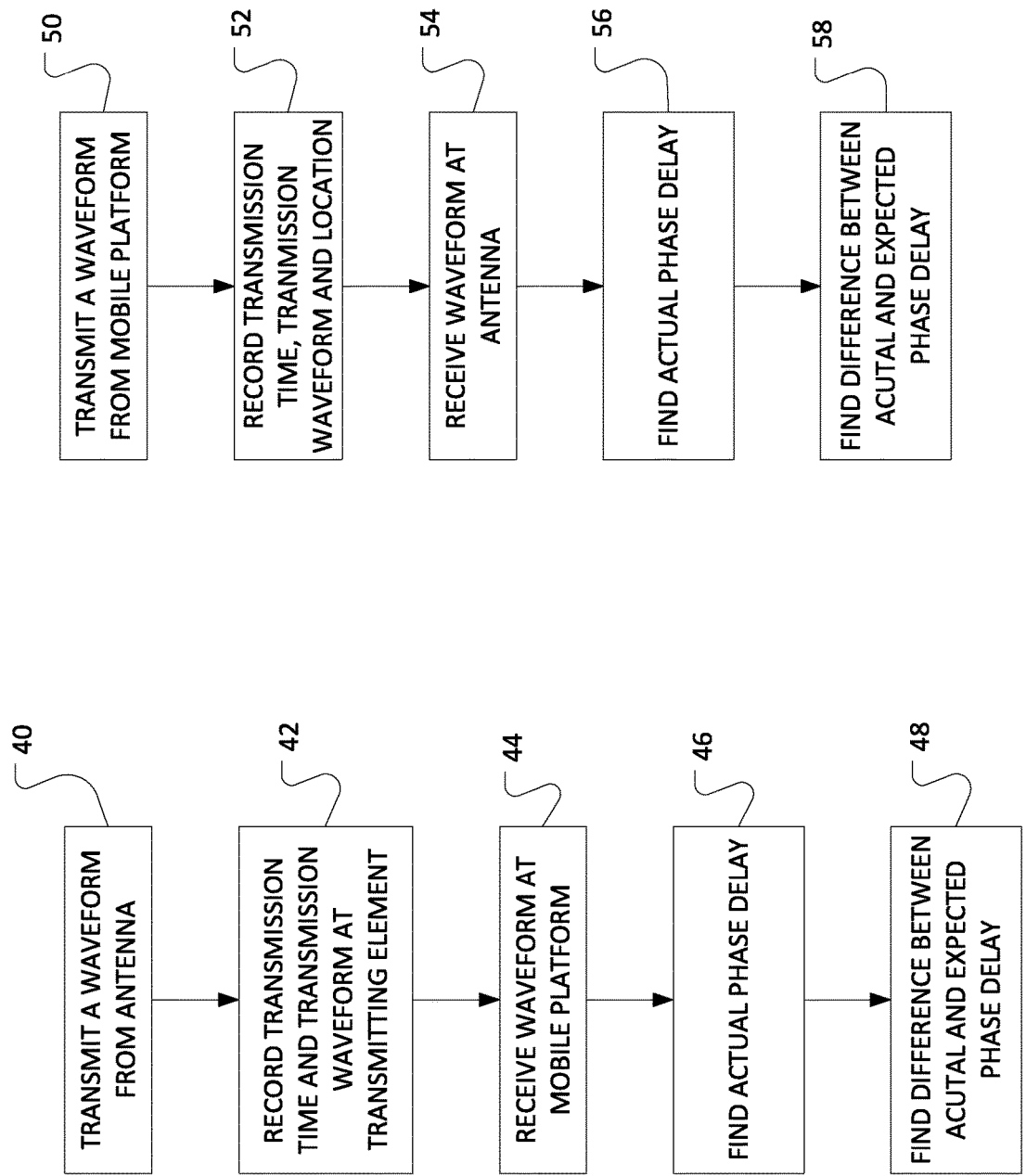
FIG. 3 shows an embodiment of a method of calibrating the transmission path of antenna elements of a phased array radar.
FIG. 4 shows an embodiment of a method of calibrating the receive path of antenna elements of a phased array radar.

FIG. 3 shows a flowchart of a method to calibration the transmission path of antenna elements of a phased-array radar. At 40, one of the antenna elements, such as 14 of FIG. 1, transmits a waveform as a transmitted signal. The waveform may be pulsed or continuous wave, frequency-chirped, may be coded or uncoded. Typically, one antenna element at a time will transmit, but transmitters could also use frequency multiplexing or waveform diversity to allow multiple antenna elements to transmit during a same time window. This would speed up the calibration process. At 42, the waveform transmission time and the waveform transmitted are recorded at the transmitting element.

The mobile platform receives the waveform at 44 at its SDR and records the time of reception. The received signal may be relayed to the ground station on another communications channel or frequency, or could be stored on-board for analysis post-flight. The received signal at the mobile platform is correlated against the transmitted signal to produce a precise phase delay at 46. The process then finds a difference between the precise phase delay found at 46 and an expected phase delay, taking into account the position of the mobile platform when it receives the signal (as recorded by the on-board GPS system). The expected phase delay is based upon the location of the transmitter relative to the receiver. The difference equals the phase delay in the transmit path including all active and passive components in the transmit chain.

FIG. 4 shows a related process for calibrating the receive path for the antenna elements. In this embodiment, the mobile platform transmits the waveform at 50 as the transmitted signal. Again, this waveform could be pulsed or continuous wave, coded or uncoded. The time, position, and transmission waveform of the mobile platform at transmission is recorded precisely at 52. In this embodiment, the antenna element receives the waveform as the received signal at 54. The received signal is then correlated against the transmitted signal at 54 to determine the precise phase delay at 56. The process then finds the difference between the precise phase delay and the expected phase delay for each antenna element at 58.

Also, the mobile platform could transmit multiple signals using frequency multiplexing or waveform diversity to communicate with multiple antenna elements. Alternatively, there could be multiple mobile platforms communicating with the antenna elements of a phased-array radar simultaneously.

To generalize the processes of FIGS. 3 and 4, one of either the mobile platform or the antenna element transmits a waveform as a transmitted signal, the other receives the transmitted signal as a received signal. The phase difference is found between the transmitted and the received signals and used to find the actual phase delay to calibrate the array.

Once calibrated, the availability of the mobile platform allows for further tuning and data gathering of the radar array. For example, the phase delays can be compensated and a transmit and received beam can be formed. The mobile platform can map out the beam pattern of the transmission signal and ensure that the radiation is adding coherently and the beam points in the right direction. Generally, this would work in the far field of the array, so may only work for small arrays or sub-groupings of large arrays. This may be determined by testing a group of elements such that the mobile platform remains in the far field, then do the test with groupings of this size.

The mobile platform can also map out the receive beam by moving around, transmitting, and having the antenna array receive the signal, or have sub-groupings of the antenna array receive the signal.

In addition to pattern measurement and beam formation, the mobile platform could measure the sidelobes and spillover energy in a reflector system. Knowing the level of spillover allows establishment of a system noise temperature and determination of an optimal illumination of the reflector. Radiation of the back lobe also contributes to overall system noise, also measurable using the drone.

In this manner, calibration of phased-array radar can be achieved with higher precision and faster speed using a moving reference point. The use of a mobile platform also allows for other calibration and measurements to finely tune the performance of the phased-array radar.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of calibrating a phased-array radar, the method comprising:
   receiving a transmission as a received signal, at one of either a mobile platform or an antenna element of the phased-array radar, the transmission being sent as a transmitted signal from the other of the mobile platform or the antenna element, the mobile platform is a powered drone or an unpowered platform;
   correlating the received signal to the transmitted signal to produce an initial phase delay for that antenna element;
   determining a difference between the phase delay and an expected phase delay, wherein the expected phase delay is based upon a relative position between the antenna element and the mobile platform; and
   saving the difference as a final phase delay for the antenna element.

2. The method of claim 1, wherein receiving the transmission comprises receiving transmissions from the antenna element of the phased-array radar at the mobile platform.

3. The method of claim 2, wherein receiving the transmission comprises receiving transmissions from multiple antenna elements.

4. The method of claim 1, wherein receiving the transmission comprises receiving the transmission at the antenna element from the mobile platform.

5. The method of claim 1, wherein receiving transmissions comprises receiving frequency multiplexed signals.

6. The method of claim 1, wherein receiving transmissions comprises receiving waveform diverse signals.

7. The method of claim 1, wherein receiving a transmission comprises receiving one of a pulsed, continuous wave, frequency-chirped, coded or uncoded signal.

8. The method of claim 1, wherein correlating the received signal to the transmitted signal comprises relaying the transmission to a ground station on a different communication channel or at a different frequency.

9. The method of claim 1, wherein correlating the received signal to the transmitted signal comprises storing the transmission on the mobile platform and performing the correlation after the mobile platform stops moving.

10. The method of claim 1, further comprising:
    compensating for the phase delays;
    forming a transmit and receive beam; and
    mapping a pattern for the beam to ensure coherent radiation and correct beam pointing.

11. The method of claim 1, further comprising measuring sidelobes and spill-over energy.

12. The method of claim 1, wherein the mobile platform is one of a network of mobile platforms.

13. The method of claim 1, wherein the mobile platform is the powered drone.

14. The method of claim 1, wherein the mobile platform is the unpowered platform.

15. A system for calibrating a phased-array radar, the system comprising:
a phased-array radar having an array of antenna elements;
a mobile platform capable of flying within coverage of the phased-array, the mobile platform is a powered drone or an unpowered platform, the mobile platform having:
an antenna;
a transmitter to transmit signals through the antenna to the phased-array radar;
a software defined receiver tuned to operations of the phased-array radar; and
a global positioning satellite receiver, the software defined receiver finding a difference between an initial phase delay for at least one of the antenna elements of the array of antenna elements and an expected phase delay and taking into account a position of the mobile platform as obtained by the global positioning satellite receiver, the expected phase delay is based upon a relative position between the at least one of the antenna elements of the array of antenna elements and the mobile platform.

16. The system of claim 15, further comprising at least one ground station, in communication with the mobile platform.

17. The system of claim 15, further comprising a processor to execute software instructions, the instructions to cause the system to:
receive a transmission having a recorded transmission time;
correlating a time of reception of the transmission to the recorded transmission time to produce an initial phase delay for that antenna element;
determining a difference between the phase delay and an expected phase delay, wherein the expected phase delay is based upon a relative position between the antenna element and the mobile platform; and
saving the difference as a final phase delay for the antenna element.

18. The system of claim 15, wherein the processor resides on the mobile platform.

19. The system of claim 15, wherein the processor resides in the ground station.

20. The system of claim 15, wherein the mobile platform comprises a network of mobile platforms.

21. The system of claim 15, wherein the mobile platform is the powered drone.

22. The system of claim 15, wherein the mobile platform is the unpowered platform.

* * * * *